Patented Oct. 15, 1946

2,409,548

UNITED STATES PATENT OFFICE 2,409,548

PLASTICIZED POLYVINYL ACETAL

Max O. Debacher, Springfield, Mass., assignor to Monsanto Chemical Company, St. Louis, Mo., a corporation of Delaware No Drawing. Application September 24, 1943, Serial No. 503,657

19 Claims. (Cl. 260—36)

This invention relates to improved compositions comprising polyvinyl acetal resins and partial esters of polyhydric alcohols. More particularly, this invention relates to compositions comprising polyvinyl acetal resins and glyceryl monoesters of saturated long chain fatty acids.

Plasticized polyvinyl acetal resin compositions have many advantageous characteristics as is known to those skilled in the art. However, for certain purposes the use of such compositions has been restricted to some extent, thus making it desirable to effect improvements in certain properties as for example, in retention of plasticizer.

It is an object of this invention to provide improved polyvinyl acetal resin compositions. A further object is to provide plasticized polyvinyl acetal resins with a high degree of retention of plasticizer over long periods of time and particularly at elevated temperatures.

According to the present invention, improved compositions are prepared comprising polyvinyl acetal resins and partial esters of polyhydric alcohols and saturated fatty acids containing at least 10 carbon atoms, the polyhydric alcohol residues containing at least two free hydroxyl groups. More particularly, improved compositions are prepared which comprise polyvinyl acetal resins and glyceryl monoesters of saturated fatty acids containing from 10 to 20 carbon atoms.

According to one embodiment of this invention, particularly when exceptionally high tensile strengths are desired, the esters employed are those in which the acid residues contain from 17 to 19 carbon atoms. According to another embodiment of this invention, particularly when flexibility is desired, the esters employed are those in which the acid residues contain from 11 to 14 carbon atoms. The foregoing groups of esters are especially advantageous when the polyhydric alcohol residue is the residue of glycerin.

Polyvinyl acetal resins may be prepared, for example, by hydrolyzing a polvinyl ester, for example, polyvinyl acetate, and then reacting the resulting hydrolysis product with an aldehyde. These resins may contain a certain proportion of ester and hydroxyl groups in addition to the acetal groups. U. S. patent to Morrison et al. Re. 20,430, dated June 20, 1937, illustrates suitable methods for preparing such resins. The polyvinyl acetal resins may be made from various aldehydes or mixtures thereof, or even from ketones containing an active carbonyl group. Thus, formaldehyde, acetaldehyde, propionaldehyde, butyraldehyde, valeraldehyde, hexaldehyde, benzaldehyde, crotonaldehyde, cyclohexanone and the like and mixtures thereof may be employed. In general, polyvinyl acetal resins made from saturated lower aliphatic aldehydes are preferred and, in particular, polyvinyl acetal resins made with saturated aliphatic aldehydes containing less than 6 carbon atoms and especially those made with butyraldehyde, are preferred. When the polyvinyl acetal resins contain ester groups, the nature of the ester groups may be substantially varied, but are preferably residues of saturated lower aliphatic acids such as acetic, propionic and butyric.

According to one embodiment of this invention, the polyvinyl acetal resins employed contain, on a weight basis, at least 5% hydroxyl groups calculated as polyvinyl alcohol, and preferably, from 5 to 25% hydroxyl groups. These resins may also contain from 0 to 30% ester groups calculated as polyvinyl ester, the ester groups preferably being acetate.

According to one embodiment of this invention, when the acetal groups are butyraldehyde acetal, the resins employed may be considered to be made up, on a weight basis, of 12–22% hydroxyl groups, calculated as polyvinyl alcohol and from 15 to 30% acetate groups calculated as polyvinyl acetate and the balance substantially butyraldehyde acetal. According to another embodiment, when the acetal groups are butyraldehyde acetal, the resins employed may be considered to be made up, on a weight basis, of 16 to 20% hydroxyl groups calculated as polyvinyl alcohol, less than 3% acetate groups calculated as polyvinyl acetate and the balance substantially butyraldehyde acetal.

According to one embodiment of this invention, when the acetal groups are acetaldehyde acetal, the polyvinyl acetal resin employed may be considered to be made up, on a weight basis, of 5 to 15% hydroxyl groups calculated as polyvinyl alcohol, 15 to 20% acetate groups calculated as polyvinyl acetate and the balance substantially acetaldehyde acetal.

According to one embodiment of this invention, when the acetal is formaldehyde acetal, the polyvinyl acetal resin may be considered to be made up, on a weight basis, of 5 to 10% hydroxyl groups calculated as polyvinyl alcohol, 10 to 15% acetate calculated as polyvinyl acetate and the balance substantially formaldehyde acetal.

An example of a mixed acetal resin is one containing, on a weight basis, 13% hydroxyl groups calculated as polyvinyl alcohol, 2 to 6% acetate groups calculated as polyvinyl acetate and the balance 65–50 mol per cent acetaldehyde acetal and 35–50 mol per cent butyraldehyde acetal.

The ester plasticizers employed according to this invention are polyhydric alcohol partial esters, the polyhydric alcohol residues thereof containing at least two free hydroxyl groups, made with saturated fatty acids containing more than 9 and preferably from 10 to 20 carbon atoms. As examples of polyhydric alcohols from which these esters may be made are glycerin, mannitol, sorbitol, glucose, erythritol and the like. Examples of saturated fatty acids which may be employed in preparing the partial esters are decanoic acid, undecanoic acid, dodecanoic acid, tridecanoic acid, tetradecanoic acid, pentadecanoic acid, hexadecanoic acid, heptadecanoic acid, octadecanoic acid and nonadecanoic acid. These acids may have straight or branched chains or substituted chains, for example, substituted with chlorine or hydroxyl groups, as for example, monochlorooctadecanoic acid, monohydroxydodecanoic acid, and the like.

According to one embodiment of this invention, the esters employed are glycerol monoesters, for example, glyceryl monododecanoic acid, glyceryl mono-octadecanoic acid, glyceryl monoester of monohydroxy-dodecanoic acid, and the like.

The following examples illustrate the improved compositions of the present invention, but are not limitative thereof. Where parts are specified, the parts are by weight.

The polyvinyl bytyraldehyde acetal resin employed in the examples is prepared from a polyvinyl acetate of such a degree of polymerization that a 1-molar benzene solution possesses a viscosity of substantially 50–55 centipoises at 20° C. The polyvinyl butyraldehyde acetal resin may be considered to be made up on a weight basis of 16–20% hydroxyl groups calculated as polyvinyl alcohol, less than 3% acetate groups calculated as polyvinyl acetate and the balance substantially butyraldehyde acetal.

Example I

| | Parts |
|---|---|
| Polyvinyl butyraldehyde acetal resin | 100 |
| Glyceryl mono-octadecanoate | 75 |

The foregoing ingredients may be mixed in a suitable manner for example, by means of a Banbury mixer. The resulting composition is a tough, water resistant, homogeneous mass, capable of being formed, for example, by extrusion, into a sheet, or of being dissolved in a suitable solvent, for example, an ethanol-toluene mixture, or otherwise processed for its ultimate use. No exudation of plasticizer from the composition of this example occurs on long continued use and the composition shows a high retentivity of plasticizer over long periods of time even at elevated temperatures.

Example II

| | Parts |
|---|---|
| Polyvinyl butyraldehyde acetal resin | 100 |
| Glyceryl mono-dodecanoate | 75 |

The above ingredients are made into a homogeneous composition in the same manner as that described in Example I. The resulting composition is found to show high retentivity of plasticizer even at elevated temperatures and to be more flexible than the composition described in Example I.

The proportion of plasticizer employed in the foregoing examples may be substantially varied to meet particular requirements. For example, the proportion of plasticizer may be varied between 50 and 100 parts to produce highly advantageous compositions exhibiting high plasticizer retentivity.

The following is an example employing a mixture of plasticizers only one of which is a partial ester of a polyhydric alcohol.

Example III

| | Parts |
|---|---|
| Polyvinyl butyraldehyde acetal resin | 100 |
| Glyceryl mono-dodecanoate | 45 |
| Butyl ricinoleate | 45 |

A composition prepared from the above ingredients is somewhat more flexible than the composition of Example II. In place of butyl ricinoleate, dibutyl sebacate, triethylene glycol dihexoate, the dimethyl amide of acids derived from castor oil, dibutyl phthalate or the like may be employed.

The following example is illustrative of compositions containing the plasticizers of the present invention which may be converted into an insoluble, infusible state. The phenolic resin employed in this example is an oil soluble resin prepared by reacting para-tertiary butyl phenol and formaldehyde, under alkaline conditions.

Example IV

| | Parts |
|---|---|
| Polyvinyl butyraldehyde acetal resin | 100 |
| Glyceryl monododecanoate | 45 |
| Butyl ricinoleate | 45 |
| Phenolic resin | 10 |
| Zinc oxide | 20 |

The polyvinyl acetal resin and the ester plasticizers are mixed in a Banbury mixer to form a homogeneous composition, the resulting composition is placed on constant speed milling rolls heated to a temperature of 105–120° C. and thereafter the phenolic resin and the zinc oxide are added. When desired the phenolic resin and the zinc oxide may be incorporated with the plasticized polyvinyl acetal resin in the Banbury mixer.

The resulting composition possesses the characteristic of being converted into an insoluble, infusible state by raising the temperature thereof for a sufficient period of time, for example, to 130° C. for 60 minutes. The resulting product possesses a tensile strength of 980 pounds per square inch and an ultimate elongation of 320%. The above data are obtained by means of a Scott tilting table type testing machine (IP4) with an initial jaw separation of 0.5 inch and a constant rate of increase of load using a 50-pound weight and a speed of 200 R. P. M. The sample employed is 0.020 inch thick and 0.5 inch in width and is previously conditioned for 48 hours at 25° C. and a relative humidity of 50%.

Prior to conversion into a thermoset condition the composition described above may be suitably processed, for example, by extrusion or calendering, provided that the time and temperature conditions are such as to prevent the compositions from being thermoset. When desired, the composition may be applied, for example, by calendering, to a suitable material, for example, cloth or other textile, and then converted into its insoluble, infusible state by raising the temperature thereof. After conversion into its thermoset condition the composition is highly resistant to the action of solvents, non-tacky and tough.

Example V

Example IV is repeated except that 75 parts of glyceryl mono-octadecanoate is substituted for the glyceryl mono-dodecanoate and the butyl ricinoleate, and the amount of zinc oxide is increased to 25 parts. The product, after being subjected to 135° C. for 1 hour possesses a tensile strength of 3400 pounds per square inch and an ultimate elongation of 250%, determined as in Example IV.

*Example VI*

This example illustrates the unexpected and valuable characteristics of the products of this invention in contrast to prior products.

|  | Parts |
|---|---|
| Polyvinyl butyraldehyde resin | 100 |
| Plasticizer | 75 |
| Phenolic resin[1] | 5 |
| Zinc oxide | 25 |
| Stearic acid | 1 |

[1] A resin made by reacting substantially equimolecular proportions of phenol and formaldehyde under alkaline conditions.

Two plastic compositions are prepared according to the above formulation in the manner set forth in Example I. In the first the plasticizer is glyceryl mono-octadecanoate and in the second the plasticizer is dibutyl phthalate. The resulting compositions are formed into sheets 0.020 inch thick by the well-known method of forming a press cake and then skiving sheets therefrom. The resulting sheets are cured by heating in the open at 135° C. for 60 minutes with one surface exposed. It is found that as a result of this heat treatment the sheets containing dibutyl phthalate as the plasticizer show a loss in weight equivalent to 69% of the plasticizer therein while the loss in weight of the sheets containing glyceryl mono-octadecanoate is only 3.3% based on the amount of plasticizer therein. Furthermore, it is found that the cured sheets containing dibutyl phthalate as the plasticizer have a tensile strength measured as in Example IV of only 1500 pounds per square inch and whereas that of the cured sheets containing glyceryl mono-octadecanoate is 3780 pounds per square inch.

A composition like the above compositions except that the plasticizer is glyceryl mono-tetradecanoate shows a plasticizer loss of 9.4% based on the amount of plasticizer originally present and a tensile strength of 3200 pounds per square inch measured in the same manner.

When desired, the zinc oxide may be omitted from the composition described in Example VI in preparing infusible, insoluble compositions. Other metal oxides may be employed in place of zinc oxide, for example, magnesium oxide (MgO), tin oxide (SnO) and the like.

Other phenolic resins may be employed in place of the phenolic resin employed in the examples. For example, oil-soluble resins prepared from para-tertiary amyl or para-phenyl phenol and formaldehyde may be employed. Compositions that are more rapidly converted to the infusible, insoluble state are obtained when the phenol employed is unsubstituted in the ortho and para positions, for example, phenol, resorcinol, metacresol and 1,3,5-xylenol. Other phenols that may be employed include o-cresol and p-cresol. Other aldehydes may be employed in place of formaldehyde, for example, acetaldehyde, propionaldehyde, benzaldehyde, crotonaldehyde, acrolein or mixtures thereof. Generally, substantially equal proportions of the phenol and the aldehyde are employed, although when desired up to 3 molecular proportions of the aldehyde may be employed for each molecular proportion of the phenol. The use of phenol aldehyde resins prepared under alkaline conditions promotes conversion to the infusible, insoluble state, particularly when the molecular ratio of formaldehyde to phenol does not substantially exceed 1:1. Thus, the phenol and the aldehyde may be reacted in the presence of sodium hydroxide, ammonia, barium hydroxide, or quaternary ammonium hydroxides such as dimethyl dibenzyl ammonium hydroxide or tetraethanol ammonium hydroxide.

Other aldehyde condensation products may replace the phenol-aldehyde condensation products in preparing thermosetting compositions. As examples, of other aldehyde condensation products may be mentioned aminotriazine-aldehyde condensation products such as melamine-formaldehyde resins, urea-aldehyde condensation products and the like.

The compositions of this invention may be formed into sheets or other articles or may be used for coating such materials as cloth, paper, wood, metal, concrete or other base material. Coatings on cloth may be advantageously made by calendering or by applying a solution of the composition and then evaporating the solvent. When advantageous, fillers may be included, as for example, carbon black, whiting and the like.

An extremely advantageous characteristic of the compositions of this invention is the extremely high proportions of plasticizer that may be employed without rendering the resulting compositions unduly tacky or subject to exudation on standing.

A particularly advantageous characteristic of the highly plasticized products of this invention resides in the fact that large proportions of relatively inexpensive fillers such as carbon black and whiting, may be incorporated while maintaining the high durability of articles made therefrom. For example, 75–100 parts of whiting may be incorporated with the product described in Example II to produce an extremely durable product.

What is claimed is:

1. A composition comprising a polyvinyl acetal resin and a partial ester of a polyhydric alcohol and a saturated monocarboxylic aliphatic acid containing more than 9 but less than 21 carbon atoms, the polyhydric alcohol residue containing two unreacted hydroxyl groups.

2. A composition comprising a polyvinyl acetal resin and a glyceryl monoester of a saturated monocarboxylic aliphatic acid containing more than 9 but less than 21 carbon atoms.

3. A composition as defined in claim 2 in which the polyvinyl acetal resin contains from 5 to 25% hydroxyl groups by weight calculated as polyvinyl alcohol.

4. A composition comprising a polyvinyl acetal resin made from two aliphatic aldehydes containing less than 6 carbon atoms and a glyceryl monoester of a saturated monocarboxylic aliphatic acid containing more than 9 but less than 21 carbon atoms.

5. A composition as defined in claim 1 in which the polyvinyl acetal resin is a polyvinyl butyraldehyde acetal resin.

6. A composition comprising a polyvinyl butyraldehyde acetal resin and a glyceryl monoester of a saturated monocarboxylic aliphatic acid containing more than 9 but less than 21 carbon atoms.

7. A composition as defined in claim 6 in which the polyvinyl butyraldehyde acetal resin contains 5–25% hydroxyl groups by weight, calculated as polyvinyl alcohol.

8. A composition as defined in claim 6 in which the polyvinyl butyraldehyde acetal resin contains, on a weight basis, from 5 to 25% hydroxyl groups, calculated as polyvinyl alcohol and up to 30% acetate groups calculated as polyvinyl acetate.

9. A composition as defined in claim 6 in which the polyvinyl butyraldehyde acetal resin contains, on a weight basis, 16–20% hydroxyl groups calculated as polyvinyl alcohol and up to 3% acetate groups calculated as polyvinyl acetate.

10. A composition comprising a polyvinyl butyraldehyde acetal resin containing 5–25% hydroxyl groups by weight calculated as polyvinyl alcohol, and a glyceryl monoester of a saturated monocarboxylic aliphatic acid containing more than 10 but less than 15 carbon atoms.

11. A composition comprising a polyvinyl butyraldehyde acetal resin containing 5–25% hydroxyl groups by weight calculated as polyvinyl alcohol and a glyceryl monoester of a saturated monocarboxylic aliphatic acid containing more than 16 but less than 20 carbon atoms.

12. A composition comprising a polyvinyl butyraldehyde acetal resin containing 5–25% hydroxyl groups by weight calculated as polyvinyl alcohol, and glyceryl mono-octadecanoate.

13. A composition as defined in claim 1 which also includes an aldehyde condensation product selected from the group consisting of phenol-aldehyde, urea-aldehyde and aminotriazine-aldehyde condensation products.

14. A composition as defined in claim 12 which also includes a phenol-aldehyde condensation product.

15. An infusible, insoluble product resulting from subjecting to the action of heat a composition comprising a polyvinyl acetal resin, an aldehyde condensation product selected from the group consisting of phenol-aldehyde, urea-aldehyde and aminotriazine-aldehyde condensation products and a partial ester of a polyhydric alcohol and a saturated monocarboxylic aliphatic acid containing more than 10 but less than 21 carbon atoms, the polyhydric alcohol residue containing at least two unreacted hydroxyl groups.

16. An infusible, insoluble product resulting from subjecting to the action of heat a composition comprising a polyvinyl butyraldehyde acetal resin containing 5–25% hydroxyl groups by weight calculated as polyvinyl alcohol, a phenol-aldehyde condensation product and a glyceryl monoester of a saturated monocarboxylic aliphatic acid containing more than 16 but less than 20 carbon atoms.

17. An infusible, insoluble product resulting from subjecting to the action of heat a composition comprising a polyvinyl butyraldehyde acetal resin containing 5–25% hydroxyl groups by weight calculated as polyvinyl alcohol, a phenol aldehyde condensation product and glyceryl mono-octadecanoate.

18. A composition as defined in claim 1 in which from 45 to 100 parts of the partial ester are present for every 100 parts of polyvinyl acetal resin.

19. A composition as defined in claim 11 in which from 45 to 100 parts of the monocarboxylic ester are present for every 100 parts of polyvinyl acetal resin.

MAX O. DEBACHER.